United States Patent [19]

Sadeh

[11] Patent Number: 4,464,839
[45] Date of Patent: Aug. 14, 1984

[54] THREE DIMENSIONAL DIGITIZER FOR DIGITIZING THE SURFACE CONTOUR OF A SOLID BODY

[75] Inventor: Yaacov Sadeh, Beersheva, Israel

[73] Assignee: Beta Engineering and Development Ltd., Beer Sheva, Israel

[21] Appl. No.: 400,714

[22] Filed: Jul. 22, 1982

[30] Foreign Application Priority Data

Sep. 16, 1981 [IL] Israel ............................ 63856

[51] Int. Cl.³ .............................................. G01B 7/28
[52] U.S. Cl. .................................. 33/1 M; 33/172 E; 33/189
[58] Field of Search .................. 33/174 J, 1 CC, 1 M, 33/174 TD, 189, 174 L, 172 E, 169 R, 201

[56] References Cited

U.S. PATENT DOCUMENTS 2,178,264 10/1939 Meyer ............................ 33/174 TD
3,749,501 7/1973 Wieg ................................. 33/1 M
4,031,628 6/1977 Kaesemeyer ........................ 33/201
4,060,906 12/1977 Heizmann ........................... 33/1 M
4,279,080 7/1981 Nakaya ........................... 33/172 E

FOREIGN PATENT DOCUMENTS 2231644 1/1973 Fed. Rep. of Germany ..... 33/174 J

Primary Examiner—William D. Martin, Jr.
Attorney, Agent, or Firm—Benjamin J. Barish

[57] ABSTRACT

A three-dimensional digitizer for digitizing the surface contour of a solid body comprises a probe supported on the base for contacting the solid body at a plurality of sample points, a pair of mounting members mounting the probe for movement in linear directions along the X-coordinate and Y-coordinate, respectively, with respect to the base and the solid body; and a third mounting member for mounting the solid body for movement in a rotary direction with respect to the probe.

14 Claims, 2 Drawing Figures

THREE DIMENSIONAL DIGITIZER FOR DIGITIZING THE SURFACE CONTOUR OF A SOLID BODY

BACKGROUND OF THE INVENTION

The present invention relates to three-dimensional digitizer for digitizing the surface contour of a solid body. Such digitizers are used in a number of applications, for example in connection with numerical-control (NC) machine tools to reproduce the surface contour of the solid body measured.

A number of three-dimensional digitizers are known for this purpose. Generally, such digitizers include a probe or stylus which is movable along each of the three orthogonal axes (i.e., the X-axis, Y-axis, and Z-axis) with respect to the solid body, so as to determine the three coordinates of each of the sample points on the surface of the respective solid body. Such known digitizers, however, are relatively complicated and bulky in construction.

SUMMARY OF THE INVENTION

An object of the present invention is to provide a novel three-dimensional digitizer which may be of a simpler and more compact construction than the above-mentioned known digitizers.

According to a broad aspect of the invention, there is provided a three-dimensional digitizer for digitizing the surface contour of a solid body, comprising a base for supporting the solid body; a probe supported on the base for contacting the solid body at a plurality of sample points; a first mounting member mounting the probe for movement in a linear direction along the X-coordinate with respect to the base and the solid body when supported thereon, to indicate the X-coordinate of each sample point; a second mounting member mounting the probe for movement in a linear direction along the Y-coordinate with respect to the base and the solid body, when supported thereon, to indicate the Y-coordinate of each sample point; and a third mounting member for mounting the solid body for movement in a rotary direction with respect to the probe to indicate the θ-angular coordinate of the sample point.

In the preferred embodiment of the invention described below, the first, second and third mounting members are each coupled to an encoder for electrically encoding the respective coordinates of each sample point on the solid body.

In addition, the first, second and third mounting members each cooperate with graduation markings for optically indicating the respective coordinates of the sample points on the solid body.

More particularly, in the preferred embodiment of the invention described below the first mounting member comprises a first carriage movably mounted upon one of said X- or Y-coordinates on a rail carried by the base, and said second mounting member comprises a second carriage movable along the other of said X- or Y-coordinates on a rail carried by said first carriage; said second carriage carrying said probe and also carrying a manually grippable handle for moving said probe along the X- and Y- coordinates. In addition, the third mounting member comprises an arm rotably mounted to said base overlying said first and second carriages and adapted to support said solid body, said arm being coupled to a second manually-grippable handle for rotating same, and the solid body when carried thereby, about said X-axis.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
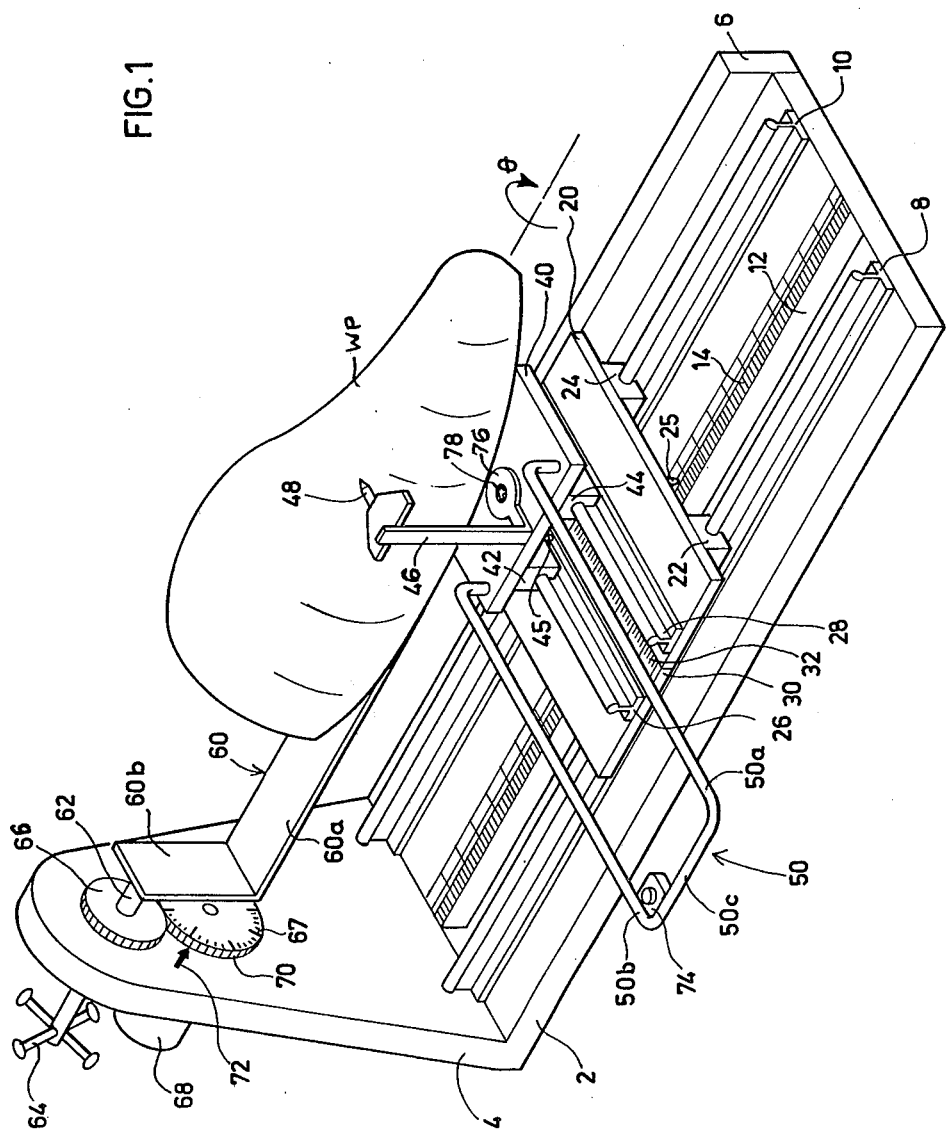
FIG. 1 is a three-dimensional view illustrating one form of digitizer constructed in accordance with the present invention.

The digitizer illustrated in the drawings comprises a horizontal base plate 2 of rectangular configuration and having, at one end, a vertical plate 4 of generally triangular configuration, the rear side of the base plate being bordered by a low upstanding wall 6. Base plate 2 supports a pair of rails 8, 10, extending longitudinally of the plate. Between the two rails, and parallel thereto, is a longitudinally-extending member 12 housing an encoder which converts displacement along the axis defined by the rails 8, 10 (the X-axis in this case) to an electrical signal. Member 12 is also formed with graduation markings 14 on its upper face to visually indicate such displacement.

Movable along the longitudinally-extending rails 8, 10 (X-axis) is a carriage, generally designated 20, having a pair of shoes 22, 24 depending from its lower face and engageable with rails 8, 10. The upper face of carriage 20 carries a further pair of rails 26, 28 extending at right angles to rails 8, 10. Between rails 26, 28 is a member 30 housing a second encoder to electrically indicate displacement along the Y-axis, which member 30 is also formed with graduation markings 32 on its upper face.

A second carriage 40 is movable along rails 26, 28 (Y-axis) at right angles to the movement of carriage 20 on rails 8, 10 (X-axis). For this purpose, carriage 40 is formed with a pair of depending shoes 42, 44 received on rails 26, 28. Carriage 40 is further formed with an upstanding bracket 46 for supporting a probe 48, and a handle 50 to facilitate the movement of the probe along both orthogonal axes of movement of the two carriages 20 and 40.

The probe 48 is adapted to be moved, as will be described more particularly below, to engage the surface of a workpiece, designated WP in FIG. 1, at a plurality of sample points thereon, and to identify the coordinates of the sample points defining the workpiece surface. As indicated above, the rails 8, 10, on which carriage 20 moves, define the X-coordinate; and the rails 26, 28 on which carriage 40 moves, define the Y-coordinate. The X-coordinate position of the probe 48 is visually indicated by a pointer 25 on carriage 20 cooperable with the graduation markings 14 on encoder housing 12; and the Y-coordinate position of probe 48 is indicated by a pointer 45 carried by carriage 40 and cooperable with the graduation markings 32 on encoder housing 30.

In this case, however, the third coordinate is not the usual Z-axis, but rather an angular coordinate, called the θ-coordinate, defining the angular position of the workpiece WP with respect to the X-axis.

To indicate the angular θ-coordinate position of the workpiece WP, the latter is mounted on a bracket 60 having a long horizontal leg 60a securing the workpiece and a short vertical leg 60b carried by a shaft 62 passing through the end plate 40 of the base 2 and terminating in a rotable knob or handle 64. Shaft 62 carrying bracket 60 carries a gear 66 meshing with another gear 67, which latter gear drives an encoder 68 for converting the angular position of the workpiece WP to an electrical signal. Gear 67 is also provided with graduation markings 70 cooperable with a pointer 72 on the inner face of the end plate 4 for visually indicating this angular position.

Handle 50 for manipulating the probe 48 along both the X- and Y-axes is of a U-shaped wire member, including a pair of parallel legs 50a, 50b secured to carriage 40 on opposite sides of the upstanding bracket 46 supporting the probe 48. The two legs 50a, 50b of handle 50 are joined by a bridging leg 50c, the latter leg having a microswitch 74 mounted thereto for convenient actuation by the user in order to read-out the coordinates of the sample points from the encoders 12, 30 and 68.

Figure 2:
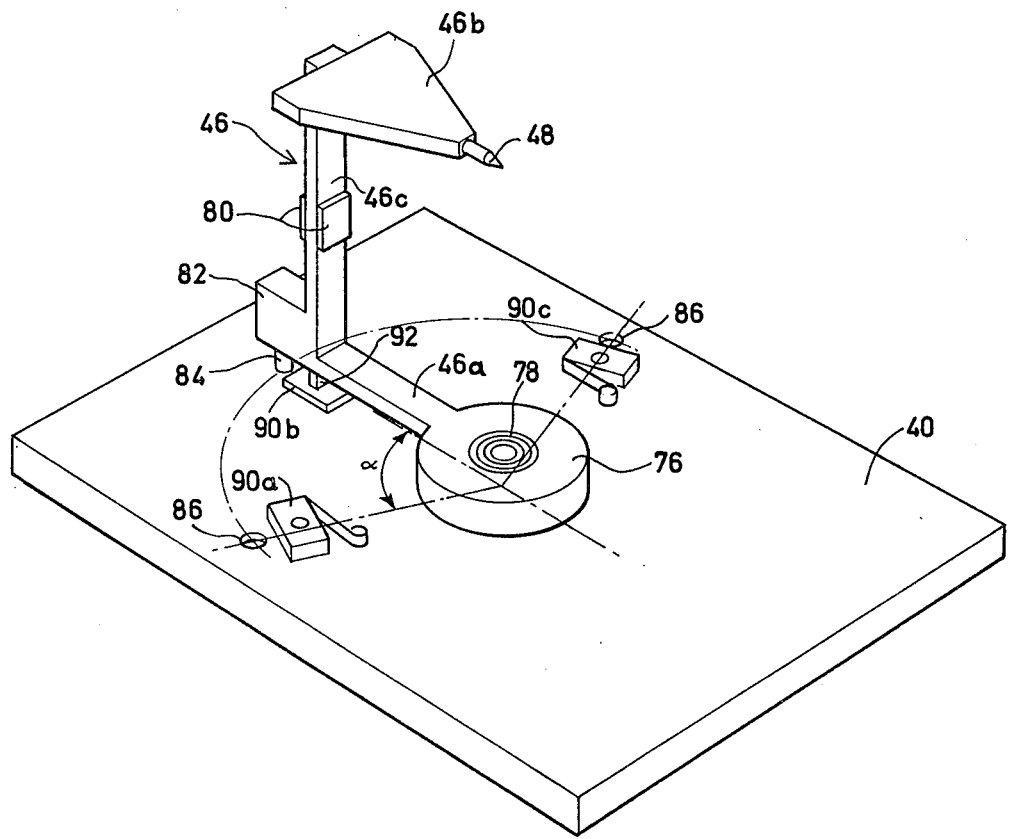
FIG. 2 is an enlarged three-dimensional view illustrating details of construction of the probe mounting means in the digitizer of FIG. 1.

Bracket 46 carrying the probe 48 is more particularly illustrated in FIG. 2. It includes a first horizontal leg 46a joined at one end to a collar 76 rotatably mounted on a pin 78 carried by carriage 40. Bracket 46 further includes a second horizontal leg 46b, of generally triangular shape and supporting the probe 48 at the apex of the triangle. Triangular leg 46b is parallel to and spaced from bracket leg 46a, and is connected thereto by a bridging vertical leg 46c. The latter leg 46c carries a strain gauge 80 which senses and indicates contacts of the probe 48 with the solid body workpiece WP. In addition, the lower end of the interconnecting leg 46c is provided with an extension 82 formd with a depending projection or pin 84 adapted to be received in a selected one of a plurality of recesses or openings 86 formed in carriage 40, for locating the bracket, and thereby the probe 48, in a selected one of a plurality of possible positions. In the example illustrated in FIG. 2, there are three such positions, each determined by a positioning opening 86 formed in carriage 40 and adapted to receive pin 84 carried by bracket 46.

Carriage 40 further includes three microswitches 90a, 90b and 90c, each located adjacent to one of the three positioning openings 86 so as to be actuated by an opperator pin 92 depending from the lower leg 46a of bracket 46. Thus, the actuated one of the three microswitches 90a–90c indicates the operative position of the probe 48 with respect to its carriage 40.

The digitizer illustrated in the drawings may be used in the following manner to identify the coordinates of a plurality of sample points on the workpiece WP. Thus, the probe 48 is first positioned to a selected angular position with respect to its carriage 40 by rotating bracket 46 about pin 78 on the carriage, the position of the probe being indicated by the actuated one of the three microswitches 90a–90c. The workpiece is then rotated to the desired angular θ-position by manipulating knob 64, this angular θ-position being electrically indicated by encoder 68 and visually indicated by graduation markings 70. The probe 48 may then be moved to a plurality of individual sample points along the X- and Y-coordinates by manipulating handle 50 to move carriage 20 along rails 8, 10, and also to move carriage 40 along rails 26, 28. The X-coordinate of the sample point is indicated electrically by encoder 12, and visually by graduation markings 14; and the Y-coordinate is indicated electrically by encoder 30, and visually by graduation markings 32.

As the probe 48 is brought into contact with the workpiece WP at each sample point, this contact is indicated by the strain gauge 80 (FIG. 2) carried by the probe-supporting bracket 46. When an electrical reading is desired, manual switch 74 carried by handle 50 is actuated by the user, which thereby effects a read-out of the electrical values in the encoder 12, 30, and 68.

It will thus be seen that the illustrated digitizer may be conveniently used for electrically and/or visually determining the coordinates of a plurality of sample points on the outer face of the workpiece WP such as to define that surface and to enable it to be reproduced by NC machine tools, for example.

While the invention has been described with respect to one preferred embodiment, it will be appreciated that many variations, modifications and applications of the invention may be made.

What is claimed is:

1. A three-dimensional digitizer for digitizing the surface contour of a solid body, comprising:
   a base for supporting the solid body;
   a probe supported on the base for contacting the solid body at a plurality of sample points;
   a first mounting member mounting the probe for movement in a linerar direction along the X-coordinate with respect to the base and the solid body when supported thereon, to indicate the X-coordinate of each sample point;
   a second mounting member mounting the probe for movement in a linear direction along the Y-coordinate with respect to the base and the solid body, when supported thereon, to indicate the Y-coordinate of each sample point;
   and a third mounting member for mounting the solid body for movement in a rotary direction with respect to the probe to indicate the θ-angular coordinate of the sample point;
   said first mounting member comprising a first carriage movably mounted along one of said X- or Y-coordinates on a rail carried by the base, and said second mounting member comprising a second carriage movable along the other of said X- or Y-coordinates on a rail carried by said first carriage; said second carriage carrying said probe and also carrying a manually grippable handle for moving said probe along the X- and Y-coordinates;
   said third mounting member comprising an arm rotatably mounted to said base overlying said first and second carriages and adapted to support said solid body, said arm being coupled to a second manually-grippable handle for rotating same, and the solid body when carried thereby, about one of said coordinates.

2. A digitizer according to claim 1, wherein said first, second and third mounting members are each coupled to an encoder for electrically encoding the respective coordinates of each sample point on the solid body.

3. A digitizer according to claim 2, wherein said first, second and third mounting members each cooperate with graduation markings for optically indicating the respective coordinates of the sample points on the solid body.

4. A digitizer according to claim 1, wherein said first handle comprises a U-shaped member including a pair of parallel legs and a bridging leg, the free ends of the parallel legs being secured to the second carriage on opposite sides of the probe.

5. A digitizer according to claim 4, wherein said bridging leg of the first handle includes a manually-operated switch for reading-out the electrical values of said encoders.

6. A digitizer according to claim 1, wherein said probe is carried on a bracket rotatably mounted to said second carriage about an axis perpendicular to said second carriage such that the probe can assume any one of a plurality of positions with respect to said second carriage.

7. A digitizer according to claim 6, wherein said bracket and second carriage include cooperable projection-and-recess means for retaining the bracket in each of its plurality of positions on the second carriage.

8. A digitizer according to claim 6, further including position-sensing means for electrically indicating each of said plurality of positions of said probe with respect to the second carriage.

9. A digitizer according to claim 8, wherein said position sensing means comprises a microswitch for each of said plurality of positions.

10. A digitizer according to claim 6, wherein said bracket further includes means for electrically sensing and indicating contact of said probe with the solid body.

11. A digitizer according to claim 6, wherein said bracket carrying the probe includes a first horizontal leg pivotably mounted to said second carriage, a second horizontal leg spaced from but parallel to said first horizontal leg and carrying said probe, and a bridging vertical leg interconnecting said first and second horizontal legs.

12. A digitizer according to claim 11, wherein said bridging vertical leg of the bracket includes a strain gauge for sensing and indicating contact of said probe with the solid body.

13. A digitizer according to claim 11, wherein said first horizontal leg of the bracket actuates a microswitch supported on the carriage at each of said plurality of positions.

14. A digitizer according to claim 11, wherein said first horizontal leg of the bracket includes a projection seatable in a recess in said second carriage at each of said plurality of positions.

* * * * *